Patented Dec. 5, 1944

2,364,422

UNITED STATES PATENT OFFICE 2,364,422

PROCESS FOR THE PRODUCTION OF NITRILES

Benjamin T. Brooks, Old Greenwich, Conn., assignor to Standard Alcohol Company, a corporation of Delaware No Drawing. Application December 31, 1941, Serial No. 425,233

10 Claims. (Cl. 260—464)

The present invention is concerned with a process for the production of unsaturated nitriles and more particularly unsaturated nitriles having a branched carbon chain structure. Unsaturated nitriles are useful in the copolymerization with conjugated dienes to form rubber-like polymers. They are also useful in copolymerization with resin-forming substances to form synthetic resins of modified characteristics. The unsaturated nitriles which are the subject of the present invention are useful as raw materials for the manufacture of alkyl acrylic acids and their esters which have special applications in the manufacture of synthetic resins.

Unsaturated nitriles have been made heretofore by the reaction of alkali cyanides upon chlorohydrins. The reaction of hydrocyanic acid with epoxides to yield cyanohydrins has heretofore been applied only to ethylene oxide and propylene oxide. The higher normal homologues of ethylene oxide containing 5 or more carbon atoms do not react with aqueous or anhydrous hydrocyanic acid at ordinary temperatures nor at temperatures as high as 100° C. It has now been found, however, that the epoxides having a branched chain structure react readily with aqueous or anhydrous hydrocyanic acid, the reaction being fairly rapid at room temperature even to the point of being exothermic. The epoxides which are thus reactive to hydrocyanic acid to form oxynitriles or cyanohydrins have the general structure:

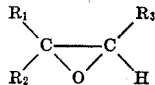

where $R_1$ and $R_2$ are alkyl radicals such as methyl, ethyl, propyl, etc. and $R_3$ is either hydrogen or an alkyl radical; as for example, isobutene oxide,

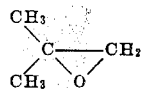

2 methyl,2-butene oxide

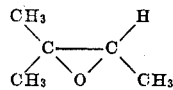

The branched carbon chain structure is of importance in the second step of the process since the cyanohydrins formed from these epoxides contain a hydroxyl group attached to a tertiary carbon atom and are easily decomposed by heat with the loss of water to form unsaturated nitriles. Heretofore the conversion of the cyanohydrins to unsaturated nitriles has been accomplished by heating the former with phosphorous pentoxide.

In the formation of cyanohydrins by the treatment of normal chlorohydrins with sodium or potassium cyanides the yields in the case of normal chlorohydrins of 4 or more carbon atoms are very poor, accompanied by the formation of dark colored tarry material. It has now been found, however, that nearly theoretical yields of cyanohydrins can be obtained from the branched chain epoxides of 4 to 8 carbon atoms by reaction with hydrocyanic acid without the formation of the dark colored by-products above-mentioned. Although aqueous or anhydrous hydrocyanic acid may be employed, it has been found that it is most economically advantageous to liberate the hydrocyanic acid from commercial alkali metal or alkaline earth metal cyanides such as sodium or calcium cyanide in aqueous solution by the action of carbon dioxide. Since carbonic acid or carbon dioxide, unlike stronger acids, does not hydrate the epoxides to form glycols, it is preferred to add the epoxide to one molecular equivalent of the cyanide in aqueous solution and pass in carbon dioxide until the gas is no longer absorbed, at which time the reactions are substantially complete. Cooling of the reaction mixture is advisable in the case of more reactive epoxides. A reaction temperature of from 20° to 40° C. is preferred although higher temperatures may be employed, moderate superatmospheric pressures being used in suitable closed apparatus.

The production of cyanohydrins from branched chain epoxides may be carried out satisfactorily in iron or steel apparatus. A closed reaction vessel provided with a stirrer and conventional cooling means, such as would readily suggest itself to one skilled in the art, gives satisfactory results. When carbon dioxide is no longer absorbed and the reaction of the epoxide and hydrocyanic acid is complete, the cyanohydrin is mechanically separated from the aqueous solution and a further quantity of cyanohydrin recovered by extraction of the aqueous solution by a suitable inert solvent such as ethyl ether, chloroform, petroleum ether, and the like.

Typical examples of the reaction find expression in the following equations:

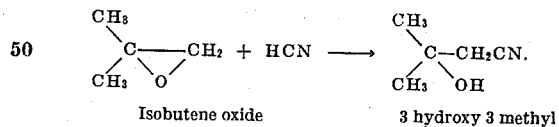

Isobutene oxide — 3 hydroxy 3 methyl n-butyro nitrile

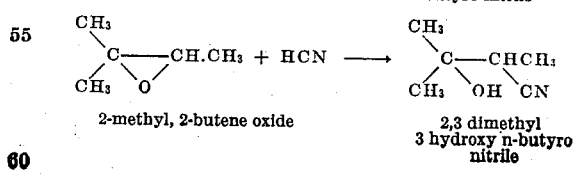

2-methyl, 2-butene oxide — 2,3 dimethyl 3 hydroxy n-butyro nitrile

Example 1

40 parts of isobutene oxide, 50 parts of sodium cyanide and 200 parts of water were placed in a reaction vessel equipped with an agitator. The agitator was started and carbon dioxide bubbled into the mixture until no more carbon dioxide could be absorbed as evidenced by the appearance of carbon dioxide bubbles on the top of the reaction mass. During the reaction the temperature was maintained at about 25 to 30° C. Agitation was continued for a few minutes to insure completion of the reaction. Agitation was then stopped and after the mixture became quiescent the cyanohydrin was decanted and the aqueous solution extracted three times with 25 parts of ethyl ether and the solvent evaporated. The residue from the evaporation was combined with the decanted cyanohydrin giving a yield of 51 parts, which were slowly distilled. The distillate from this distillation step after eliminating the water present was redistilled slowly yielding 42 parts of 3 dimethyl propene nitrile or 3 methyl, 2-butene nitrile boiling at 142° C.

Example 2

60 parts of trimethyl ethylene oxide or 2 methyl, 2-butene oxide, 45 parts of sodium cyanide and 200 parts of water were treated with carbon dioxide according to the method disclosed in Example 1. 74 parts cyanohydrin were obtained which upon slow distillation and redistillation after eliminating the water produced yielded 63 parts of 2 methyl, 3 dimethyl propene nitrile or 2,3 dimethyl 2-butene nitrile boiling at 155°–156° C.

The decomposition of cyanohydrins to unsaturated nitriles as above described takes place in such a manner that the resulting unsaturation linkage is in many cases conjugated with respect to the CN or nitrile group, thus (1) 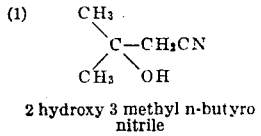  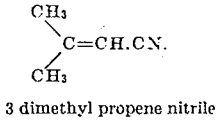

2 hydroxy 3 methyl n-butyro nitrile    3 dimethyl propene nitrile (2) 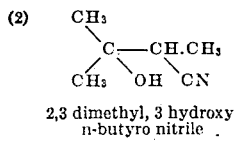  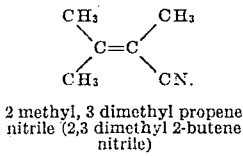

2,3 dimethyl, 3 hydroxy n-butyro nitrile    2 methyl, 3 dimethyl propene nitrile (2,3 dimethyl 2-butene nitrile)

It is probably the conjugated unsaturated character of these unsaturated nitriles which makes them of value in the synthesis of rubber-like substances by copolymerization with conjugated dienes.

What is claimed is:

1. A process for the production of alkenoic nitrile of at least 5 carbon atoms which comprises reacting a tertiary alkyl epoxide with hydrocyanic acid to yield a cyanohydrin and dehydrating the cyanohydrin.

2. A process for the production of alkenoic nitriles of from 5 to 9 carbon atoms which comprises reacting tertiary alkyl epoxide with hydrocyanic acid to yield a cyanohydrin and dehydrating the cyanohydrin.

3. A process for the production of alkenoic nitriles of from 5 to 9 carbon atoms which comprises mixing a teritiary alkyl epoxide with an aqueous solution of a cyanide chosen from the group consisting of alkali metal and alkaline earth metal cyanides, in an enclosed reactor, passing carbon dioxide into the mixture to liberate hydrocyanic acid and form a cyanohydrin from the tertiary alkyl epoxide, separating the cyanohydrin and distilling it to yield the alkenoic nitrile.

4. A process for the production of alkenoic nitriles of from 5 to 9 carbon atoms which comprises mixing a tertiary alkyl epoxide with an aqueous solution of a cyanide chosen from the group consisting of alkali metal and alkaline earth metal cyanides in an enclosed reactor, passing carbon dioxide into the mixture while maintaining the mixture at a temperature between 20° and 40° C. to liberate hydrocyanic acid and form a cyanohydrin from the tertiary alkyl epoxide, separating the cyanohydrin and distilling it to yield the alkenoic nitrile.

5. A process for the production of alkenoic nitriles of from 5 to 9 carbon atoms which comprises mixing a tertiary alkyl epoxide with an aqueous solution of sodium cyanide in an enclosed reactor, passing carbon dioxide into the mixture maintained at a temperature between 20°–40° C. to liberate hydrocyanic acid and form a cyanohydrin from the tertiary alkyl epoxide, separating the cyanohydrin and distilling it to yield the alkenoic nitrile.

6. A process for the production of 3-dimethyl propene nitrile which comprises mixing isobutene oxide with an aqueous solution of sodium cyanide, passing carbon dioxide into the mixture maintained at a temperature of from 25°–30° C. to liberate hydrocyanic acid and form 3-hydroxy, 3-methyl n-butyro nitrile, separating the 3-hydroxy 3-methyl n-butyro nitrile and distilling it to obtain 3-dimethyl propene nitrile.

7. A process for the production of 2-methyl, 3-dimethyl propene nitrile which comprises mixing 2-methyl, 2-butene oxide with an aqueous solution of sodium cyanide, passing carbon dioxide into the mixture maintained at a temperature between 25° and 30° C. to liberate hydrocyanic acid and form 2,3-dimethyl, 3-hydroxy, n-butyro nitrile, separating the 2,3-dimethyl, 3-hydroxy, n-butyro nitrile and distilling it to yield 2-methyl, 3-dimethyl propene nitrile.

8. A process for the production of 3-methyl propene nitrile which consists in mixing 40 parts of isobutene oxide with 50 parts of sodium cyanide and 200 parts of water, agitating the mixture and passing carbon dioxide into the mixture maintained at a temperature of from 25°–30° C. to liberate hydrocyanic acid and form 3-hydroxy, 3-methyl n-butyro nitrile, separating the 3-hydroxy, 3-methyl n-butyro nitrile and distilling it to yield 3-methyl, 2-butene nitrile.

9. In a process for the production of alkenoic nitriles of from 5 to 9 carbon atoms, the improvement which comprises reacting a tertiary alkyl epoxide with hydrocyanic acid to yield a cyanohydrin.

10. In a process for the production of alkenoic nitriles of from 5 to 9 carbon atoms, the improvement which comprises mixing a tertiary alkyl epoxide with an aqueous solution of a cyanide chosen from the group consisting of alkali metal and alkaline earth metal cyanides, in an enclosed reactor, passing carbon dioxide into the mixture to liberate hydrocyanic acid and form a cyanohydrin from the tertiary alkyl epoxide.

BENJAMIN T. BROOKS.